United States Patent Office 3,450,748
Patented June 17, 1969

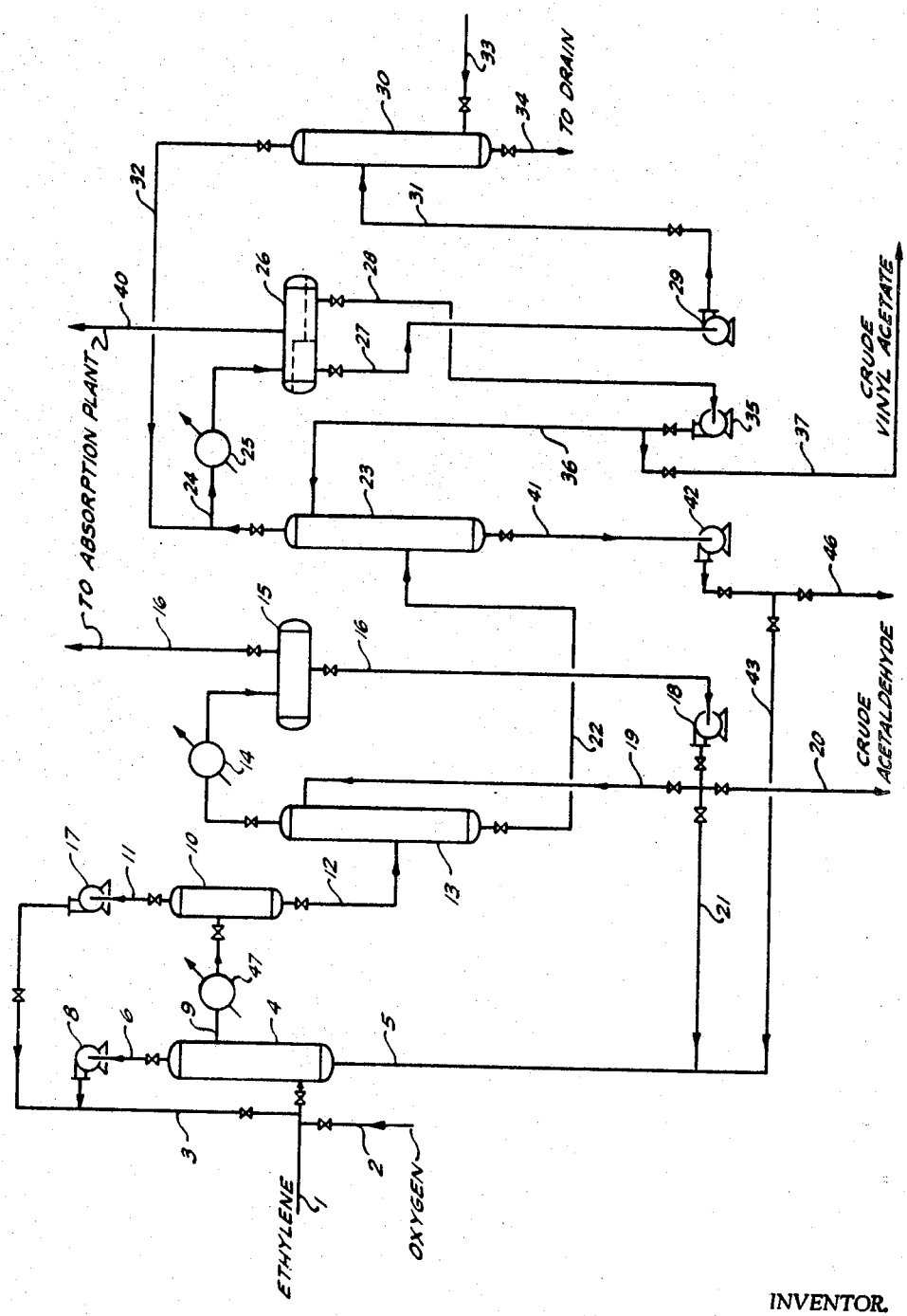

3,450,748
PREPARATION OF VINYL ACETATE, ACETALDE-
HYDE AND ACETIC ACID FROM ETHYLENE
William D. Schaeffer, Pomona, Calif., assignor to Union
Oil Company of California, Los Angeles, Calif., a corporation of California
Continuation-in-part of application Ser. No. 241,713,
Dec. 3, 1962. This application May 11, 1966, Ser.
No. 554,272
Int. Cl. C07c *69/14, 53/08*
U.S. Cl. 260—497                                10 Claims This application is continuation-in-part of my copending application Ser. No. 241,713 filed Dec. 3, 1962 and now abandoned.

This invention relates to the oxidation of ethylene to vinyl acetate.

Recently it has been proposed that ethylene be oxidized to vinyl acetate by contact with an acetic acid solution containing a soluble palladium salt and a redox chemical. Anhydrous reaction conditions are prescribed for this oxidation, since it is reasoned that the presence of water causes the formation of acetaldehyde. To avoid water formation in the reaction zone, it is proposed that the oxidation of the spent (reduced) solution be performed in a separate stage. Although it is also suggested that simultaneous oxidation can be performed in the ethylene reactor, this method requires that the reaction be conducted at pressures below the condensation pressure of water so that the latter is continuously flashed from the reactor as it is formed.

As thus proposed, there exist several disadvantages to the aforedescribed reaction. The oxidation of the catalyst solution in a separate stage is not feasible since when the solution is heated to the desired reactor temperatures prior to recycling, the dissolved palladium will oxidize most organic solvents including the preferred carboxylic acid solvent. The use of low reactor pressures to permit vaporization and removal of water from the single stage process greatly decreases ethylene solubility in the reaction medium and thus reduces the reaction rates. Additionally, the aforedescribed reaction consumes acetic acid and thus requires the purchase of these chemicals or the necessary capital investment for their synthesis.

It is an object of this invention to provide an efficient method for the oxiadtion of ethylene to vinyl acetate.

It is a further object of this invention to provide a method for the preparation of vinyl acetate wherein the only raw materials consumed are ethylene and oxygen.

Other and related objects of this invention will be apparent from the following disclosure.

I have now found that ethylene can be oxidized directly to vinyl acetate with a catalyst solution comprising an aqueous acetic acid reaction medium which contains a Group VIII noble metal and a soluble chloride or bromide. Oxygen or an oxygen-containing gas and ethylene are introduced into contact with the catalyst at temperatures between about 30° and about 300° C. at a pressure greater than about 10 atmospheres. Optionally, various "redox" compounds can also be included in the medium; however, their presence is not essential to the reaction. The pressure can be up to 100 atmospheres or more; preferably pressures from 10 to about 75 atmospheres are used to obtain high conversions.

Under the aforedescribed conditions, ethylene is oxidized to acetic acid, acetaldehyde and vinyl acetate and the yield of any or all of these products can be controlled by adjustment of the various process variables hereinafter set forth. In general, the process variables which exert the greatest influence on the yield of products are: recycling of the acetaldehyde, the water content of the reaction medium and acetate ion and halogen concentration in the reaction medium.

As previously mentioned, the essential components of my catalyst solution comprise a Group VIII noble metal and a soluble bromide or chloride. The Group VIII noble metals, platinum, rhodium, ruthenium, osmium, iridium and palladium are all active for my reaction; however, I prefer palladium because of its much greater activity. In general, the noble metal is employed in amounts between about 0.001 and 5.0 weight percent of the liquid reaction medium; preferably between about 0.05 and about 2.0 weight percent. The noble metal can be added to the reaction medium as finely divided metal, as a soluble salt or as a chelate. Examples of suitable salts are the halides and acetates such as platinum chloride, rhodium acetate, ruthenium bromide, osmium oxide, iridium chloride and palladium chloride. Examples of suitable chelates are palladium acetylacetonate and complexes of noble metal ions with such conventional chelating agents as ethylene diamine tetraacetic acid, citric acid, etc.

The other necessary component of my catalyst solution is a soluble bromide or chloride. The halogen can be added as elemental chlorine or bromine; however, it is preferred to employ less volatile halides such as hydrogen chloride; hydrogen bromide; alkali metal halides, e.g., sodium chloride, lithium bromide, cesium chloride, potassium bromide; ammonium bromide, ammonium chloride, or any of the aforementioned Group VIII noble metal bromides or chlorides. The halide should be added to provide between about 0.05 and about 5.0 weight percent halide in the reaction zone. Preferably the concentration employed is between about 0.1 and about 2.0. Within this concentration range of halide, variations in concentration can vary the distribution of the products. In general, decreasing the halide concentration will favor the production of vinyl acetate and reduce the formation of acetaldehyde. Increasing the concentration of the halide will, conversely, decrease the vinyl acetate yield and increase the yield of acetaldehyde.

The yield of vinyl acetate is maximized by use of an anhydrous or substantially anhydrous reaction medium containing less than about 5 weight percent water and by the presence of acetate ions. The maximum acetaldehyde production occurs when the reaction medium contains between about 10 and about 20 weight percent water. In the range of 5 to about 12 weight percent water the acetaldehyde and vinyl acetate are produced in approximately equal molar quantities. The yield of acetic acid is at a maximum at water concentrations between about 20 and about 70 weight percent of the reaction medium. Accordingly, variations in the concentration of water in the reaction medium provides a suitable means for controlling the yield of the various products of the oxidation.

My process thereby provides a means for obtaining vinyl acetate entirely from ethylene by producing a sufficient quantity of acetaldehyde in the reaction zone itself which can be further oxidized to acetic acid to replenish the acetic acid consumed in the formation of the vinyl acetate. The preferred embodiment of my process comprises the oxidation of ethylene to vinyl acetate with all or a portion of the acetaldehyde product being recycled to the oxidation zone for further oxidation to acetic acid to replace that depleted in the formation of vinyl acetate. The water content of the reaction medium effects distribution of the products thereby affecting the recycle rate of acetaldehyde and the ratio of vinyl acetate to acetaldehyde in the product stream. In general, the water content of the reaction medium should be less than about 20 weight percent; preferably should be between about 0 and 15 weight percent; and most preferably between about 5 and 12 weight percent.

The proportion of vinyl acetate in the oxidized products can be greatly increased by use of a reaction medium containing dissolved acetate salts. Generally, any soluble acetate salts can be added such as alkali metal acetates, e.g., sodium acetate, lithium acetate, potassium acetate; alkaline earth acetates, e.g., magnesium acetate, calcium acetate, barium acetate, etc.; any of the aforementioned Group VIII noble metal acetates or an acetate of the opitional redox metals hereafter described. The alkali metal acetates are preferred for their greater solubility in the medium. Generally between about 0.1 to about 10 weight percent of a soluble acetate salt is used; preferably between about 0.5 and about 5.0 weight percent.

It is of course apparent that the acetate salts can also be formed in situ by the addition of the hydroxides of most of the aforementioned metals, particularly the alkali metal hydroxides.

As previously mentioned, various redox compounds can, optionally, be used. Typical of such redox chemicals are soluble salts of multivalent metal ions such as the nitrates, acetates, bromides or chlorides of copper and iron. While the presence of these multivalent metal salts does not appreciably alter the course of the oxidation or the distribution of the oxidized products, a desirable increase in the rate of oxidation may in some instances be secured by their use. Thus the use of cupric salts such as cupric nitrate, acetate, chloride or bromide will increase the rate of production of oxidized products. When such optional compounds are used, concentrations from about 0.1 to about 5 weight percent; preferably from about 0.5 to about 2.0 weight percent can be used.

FIGURE 1 illustrates a typical continuous oxidation process based on my ethylene oxidation process.

As illustrated, ethylene enters the process through line 1 and is admixed with an oxygen containing gas from line 2 together with recycle unreacted gas from line 3. As previously mentioned, any convenient source of oxygen can be employed including oxygen, air and mixtures thereof. The oxygen to ethylene ratio in the gas feed is controlled so as to avoid explosive compositions, generally, oxygen contents less than about 20 percent and preferably between about 1 and about 10 percent are to be used. The gas is admitted to the reactor 4 which is a pressure vessel lined with a suitable corrosion resistant material, e.g., titanium or titanium-palladium alloys. The gas flows concurrently with the liquid reaction mixture containing the catalyst which is admitted to the reactor through line 5. Generally, high gas rates are employed and the excess or unconverted gas is withdrawn from the reactor through line 6 to recycle gas compressor 8 for pressurization and return to the reaction.

The liquid reaction medium is withdrawn from reactor 4 through line 9 and passed to flash drum 10 where the pressure is reduced to between about 25 and about 125 p.s.i.g. A cooler 47 can be used in line 9 to reduce the liquid reaction product temperature about 25° to about 150° C. as desired. In flash zone 10, dissolved ethylene is removed from the liquid and passed by line 11 to a second compressor 17 for recycling to the oxidation step. If desired, a substantial portion of the acetaldehyde can also be vaporized from the liquid in flash drum 10 and recycled to the reactor through line 11. To avoid condensation problems in this gas recycle line, however, it is preferred only to remove the dissolved ethylene in flash drum 10 and to separate the acetaldehyde in a subsequent distillation zone. The liquid residue from flash zone 10, contaniing the oxidized products, reaction medium and catalyst, is passed through line 12 to fractionation zone 13.

In fractionation zone 13, the acetaldehyde is vaporized and recovered overhead, condensed in cooler 14 and collected in distillate drum 15. Residual gases are removed from the distillate drum through line 16 and passed to a gas recovery plant where the trace amounts of ethylene are recoverable by any suitable method, e.g., absorption.

The acetaldehyde is withdrawn from the distillate drum by line 16 and pump 18. A portion of this product is passed through line 19 as reflux for distillation zone 13 in the manner conventional in the art. A portion of the acetaldehyde can also be withdrawn through line 20 as crude acetaldehyde product or the entire acetaldehyde make may be passed by line 21 to line 5 for recycle to the oxidation zone.

The acetaldehyde is preferably oxidized to furnish the acetic acid consumed in the vinyl acetate synthesis and the entire process can thereby be based solely on ethylene as the hydrocarbon feed. This avoids the need to purchase acetic acid or the capital investment necessary for manufacture of acetic acid. Because the acetaldehyde is produced in the same reactor used for vinyl acetate synthesis, only a minor increase in size of the reactor and product fractionators is necessary to produce sufficient acetaldehyde to supply all the acetic acid demand of the plant. The cost of this incremental size change is only a fraction of the cost of a separate plant for the oxidation of acetic acid.

The process can be readily controlled to the desired rate of acetaldehyde or vinyl acetate production by altering one of the variables of water, halide ion or acetate ion concentration in the manner previously mentioned and as demonstrated in Examples 1–10 (water content), Example 22 (halide content) and Examples 11 and 12 (acetate content). In this manner an entirely ethylene "bootstrap" process can be practiced.

The acetaldehyde is readily oxidized to acetic acid in a separate reactor or, preferably, in the vinyl acetate synthesis reactor simply by recycling this material to the vinyl acetate reactor. When the oxidation is performed in a separate reactor it can be practiced by contacting the acetaldehyde with oxygen at a temperature between 30 and 300° C. and sufficient pressure, 10 to 1000 atmospheres, to maintain a liquid phase. Acetic acid can be used as a reaction medium and, if desired, all or a portion of the acetic acid recycle to the vinyl acetate reactor can be used as the reaction medium.

Preferably the acetaldehyde is simply recycled to the vinyl acetate synthesis zone and oxidized therein to acetic acid. The acetaldehyde when supplied to this reactor in an amount comprising from 5 to about 20 percent, preferably from 7 to 15 percent of the liquid reaction medium will be oxidized at a sufficient rate to supply all the acetic acid requirements of the process.

The liquid residue from fractionation zone 13 is withdrawn through line 22 and passed to a crude vinyl acetate distillation zone 23. In this distillation, an azeotropic mixture of water and vinyl acetate are removed overhead through line 24, condensed in cooler 25 and passed to distillate drum 26. Any non-condensed gases in distillate drum 26 are withdrawn and passed to suitable recovery units, e.g., an absorption plant. In distillate drum 26, the condensate separates into an aqueous phase which is withdrawn through line 27 and a vinyl acetate phase which is withdrawn through line 28. The aqueous phase is forced by pump 29 to water stripper 30 through line 31. Generally this aqueous condensate contains between about 0.5 and about 2.5 weight percent of vinyl acetate which is recovered by steam stripping in zone 30 and passed as a vapor through line 32 to combine with the azeotrope vapors in line 24. Suitable amounts of a stripping gas, e.g., steam, are admitted through line 33 to tower 30. The stripped water is then sent to the drain through line 34.

The vinyl acetate layer is withdrawn from condensate drum 26 by pump 35 and used as reflux through line 36 to distillation tower 23 in the conventional manner. A portion of the condensate is also passed through line 37 as crude vinyl acetate product.

During the oxidation, slight amounts of low-boiling materials are formed such as methyl acetate, ethyl acetate, etc., and these impurities can be removed from the crude vinyl acetate by conventional distillation steps in the manner apparent to those skilled in the art.

The catalyst solution is recovered for recycling as bottoms from distillation zone 23. This solution is withdrawn through line 41 to pump 42 which returns the solution to the reactor through line 43. During the oxidation, a slight degree of polymerization of the vinyl acetate may occur. To prevent the build-up of this polymer in the liquid reaction medium, a portion of the catalyst recycle from pump 42 may be withdrawn through line 46. This net withdrawal of solution may comprise between about 0.1 and about 10 weight percent of the total catalyst recycle through line 41. The catalyst solution withdrawn through line 46 is passed to suitable recovery steps, such as an oxidation step for the oxidation of the polyvinyl acetate and other high boiling byproducts to acetic acid. If desired, the byproduct fractions separated in the crude vinyl acetate fractionation (not shown) can be combined with this stream for oxidation to acetic acid. Various well known oxidation conditions can be employed to convert these byproducts to acetic acid.

The oxidation of the aforementioned byproducts, i.e., methyl and ethyl acetates and high boiling byproducts, can be catalytic or non-catalytic in which the byproducts are contacted, in liquid phase, with an oxygen containing gas at temperatures between about 200° and about 500° F. and sufficient pressure to maintain liquid phase conditions. Preferably, the oxidation is conducted in the presence of a suitable oxidation catalyst such as a heavy metal having an atomic number of 23 to 28, inclusive. Examples of such metals are manganese, cobalt, nickel, chromium, vanadium, molybdenum, tungsten, tin, cerium and mixtures thereof. When so used, the catalyst metal is employed in amounts between about 0.01 and about 5 weight percent as a soluble salt such as the acetate, chloride, bromide, etc., as finely divided metal or as a chelate. It is also preferred to have between about 0.01 and 2.0 weight percent of a bromine containing substance in this oxidation step to promote the oxidation; no bromine need be added when sufficient bromine is present in the liquid residue from tower 23; however, if necessary, any of the aforementioned bromine compounds can be added to this oxidation step. The oxidized product from this step can then be recycled directly to reactor 4 as a supply of a portion of the acetic acid consumed during the oxidation in this reactor.

The following examples will illustrate the process of my invention.

EXAMPLES 1 TO 10

A one-gallon autoclave fitted with a Teflon cup, titanium cooling coil and stirrer was charged with 500 grams of a liquid reaction medium which contained 3.5 grams of 48 percent strength hydrobromic acid and 1.5 grams of palladium chloride. The autoclave was then pressurized to 500 p.s.i.g. with ethylene, heated to 300° F. and nitrogen then added to raise the pressure to 900 p.s.i.g. Oxygen was then slowly added to maintain the pressure at about 920 p.s.i.g. over a reaction period of 30 minutes.

This procedure was repeated for a series of experiments in which the reaction medium composition was varied from 0 to 100 weight percent water and the organic liquid concentration was varied from 0 to 100 weight percent. The following table presents the yields of products obtained from each of the experiments:

Table 1
Ethylene Oxidation

| | Exp. 1 | Exp. 2 a | Exp. 3 | Exp. 4 | Exp. 5 | Exp. 6 | Exp. 7 | Exp. 8 | Exp. 9 | Exp. 10 |
|---|---|---|---|---|---|---|---|---|---|---|
| Water Content of Solvent (Wt. percent) | 0 | 4 | 7 | 10 | 15 | 20 | 30 | 50 | 80 | 100 |
| Amount of Ethylene Oxidized (Grams) | 14.2 | 28.5 | 26.6 | 30.4 | 44.5 | 57.4 | 41.9 | 58.5 | 21.5 | 3.6 |
| Products, Mol Percent: | | | | | | | | | | |
| Acetaldehyde | 46.9 | 51.4 | 70.9 | 66.4 | 65.2 | 33.5 | 31.5 | 16.2 | 66.8 | 93.0 |
| Vinyl acetate | 39.5 | 33.8 | 23.1 | 10.8 | | 2.3 | 2.9 | 1.0 | | |
| Methylethylketone and ethyl acetate | | | | | | .7 | 5.7 | 4.1 | 7.2 | 7.0 |
| Acetic Acid | (Not measured) | | | 16.9 | 23.1 | 5.3 | 5.7 | | 26.0 | |
| Diester | 6.9 | 3.4 | 3.6 | 3.8 | 4.3 | 45.7 | 46.9 | 71.7 | | |
| Polymer | 6.9 | 11.6 | 2.4 | 2.1 | 1.5 | 8.7 | 11.4 | 4.3 | | |
| | | | | | | 4.5 | 1.6 | 2.7 | | | a One hour contact.

EXAMPLE 11

The autoclave was charged with 500 grams acetic acid, 1.0 gram palladium chloride, 6.0 grams lithium bromide and 3.0 grams cupric acetate, pressured to 500 p.s.i.g. with ethylene, heated to 300° F. and, finally, pressured to 900 p.s.i.g. with nitrogen. Oxygen was then slowly admitted to the autoclave at a rate sufficient to maintain the pressure at about 920 p.s.i.g. At the conclusion of a 30-minute pediod, the run was discontinued and the autoclave contents were distilled to isolate the products. The following yields of products were obtained:

Table 2

| Product: | Yield, mol percent |
|---|---|
| Acetaldehyde | 24.1 |
| Vinyl acetate | 66.9 |
| Ethylene glycol diacetate | 5.2 |
| Polyvinyl acetate | 3.8 |

The total weight of recovered products was 46 grams.

EXAMPLE 12

The experiment was repeated with the addition of 6 grams lithium acetate dihydrate to an otherwise identical catalyst solution to that used in Example 11. At the end of 15 minutes the reaction was discontinued and a distillation of the autoclave contents yielded the following results:

Table 3

| Product: | Yield, mol percent |
|---|---|
| Acetaldehyde | 13.9 |
| Vinyl acetate | 78.5 |
| Ethylene glycol diacetate | 2.8 |
| Polyvinyl acetate | 4.8 |

The total weight of recovered products was 52 grams.

The preceding experiments and Example 1 demonstrate the effect of acetate ion on the ratio of vinyl acetate to acetaldehyde. This ratio is summarized as a function of the acetate salt concentration in the reaction medium:

Table 4

| Experiment | Acetate Salt Concentration (Milliequivalent Weights Per Liter) | Mol Ratio Vinyl Acetate to Acetaldehyde |
|---|---|---|
| 1 | None | 0.84 |
| 11 | 33.1 | 2.77 |
| 12 | 151.1 | 5.65 |

The preceding demonstrates the effect of acetate ion concentration of the yield of vinyl acetate and that the process can be readily controlled to vinyl acetate or acetaldehyde production by adjustment of the acetate ion concentration.

EXAMPLE 13

The autoclave was charged with a catalyst solution identical to that of Example 12 except that cupric acetate was omitted. At the end of 15 minutes, the reaction was discontinued and the autoclave contents were distilled to obtain the following yields of products:

Table 5

| Product: | Yield, mol percent |
|---|---|
| Acetaldehyde | 20.8 |
| Vinyl acetate | 73.2 |
| Ethylene glycol diacetate | 2.2 |
| Polyvinyl acetate | 5.3 |

The total weight of recovered products was 72 grams.

A comparison of the results with those obtained in Examples 11 and 12 show that elimination of the cupric salt did not affect the yields of oxidized product. The mol ratio of vinyl acetate to acetaldehyde decreased somewhat from that of Example 12 (from 5.65 to 3.52); however, this decrease correlates to the decrease in acetate concentration.

EXAMPLE 14

The autoclave was charged with 500 grams acetic acid, 0.5 gram palladium and 6.0 grams cupric acetate, then pressured to 500 p.s.i.g. with ethylene, heated to 300° F. and pressured to 900 p.s.i.g. with nitrogen. Oxygen was admitted to the autoclave, however, no absorption was observed over a 40-minute period and no oxidized products were formed.

EXAMPLE 15

Example 14 was repeated, except that 1.0 gram of lithium bromide was added. A slight absorption of oxygen occurred over a 30-minute period and a total of about 9 grams of oxidized product was obtained.

A comparison of Example 14, 15 and 11 indicates the effect of halogen ion concentration on the reactivity of the system and establishes that presence of a halogen is essential to the oxidation.

EXAMPLE 16

The autoclave was charged with 500 grams acetic acid containing 1.0 gram palladium chloride, 6.0 grams lithium acetate dihydrate and 3.0 grams lithium chloride. The autoclave was thereafter pressured to 300 p.s.i.g. with ethylene, heated to 300° F., then pressured to 900 p.s.i.g. with nitrogen and oxygen was admitted to maintain the pressure at about 920 p.s.i.g. After 15 minutes the reaction was discontinued and the autoclave contents were removed and distilled to recover 21 grams of a crude product with the following yields:

Table 6

| Product: | Yield, mol percent |
|---|---|
| Acetaldehyde | 39.9 |
| Vinyl acetate | 44.8 |
| Ethylene glycol diacetate | 3.5 |
| Polyvinyl acetate | 11.7 |

EXAMPLE 17

Example 16 was repeated, however the amount of lithium chloride was increased to 6.0 grams. The reaction was continued over a 30-minute period to yield a total of 50 grams oxidized product having a yield as follows:

Table 7

| Product: | Yield, mol percent |
|---|---|
| Acetaldehyde | 38.0 |
| Vinyl acetate | 52.1 |
| Ethylene glycol diacetate | 1.4 |
| Polyvinyl acetate | 6.7 |

The preceding demonstrate that chlorine compounds are also effective to promote the oxidation, although their activity for vinyl acetate synthesis is substantially less than bromine compounds.

EXAMPLE 18

The autoclave is charged with a mixture of 480 grams acetic acid and 20 grams water which contains 1.0 gram palladium chloride, 6.0 grams lithium acetate, 6.0 grams lithium bromide and 20 grams acetaldehyde. The autoclave is pressured to 500 p.s.i.g. with ethylene, heated to 300° F., pressured to 900 p.s.i.g. with nitrogen and oxygen is slowly admitted to maintain the pressure near 920 p.s.i.g. After a 30-minute reaction period, the contents of the autoclave are distilled to recover 144 grams of oxidized product which has the following yield:

Table 8

| Product | Distribution in raw product (Mol Percent) | Net Production (Mol Percent) |
|---|---|---|
| Acetaldehyde | 26.1 | 2.5 |
| Vinyl acetate | 67.2 | 88.5 |
| Ethylene glycol diacetate | 2.5 | 3.4 |
| Polyvinyl acetate | 4.2 | 5.6 |

This example illustrates the overall process of my invention wherein the acetaldehyde product is recycled to the oxidation zone to decrease the net production of this compound in favor of vinyl acetate production. The oxidation of acetaldehyde to acetic acid in the vinyl acetate synthesis zone is also illustrated by Examples 19–21.

EXAMPLE 19

Into a one-half gallon autoclave was charged 500 grams acetic acid containing 1 gram palladium chloride, 6 grams lithium bromide and 6 grams lithium acetate dihydrate. Fifteen grams acetaldehyde were charged to the reaction zone and the autoclave was closed, pressured to 500 p.s.i.g. with ethylene and heated to 300° F. Thereafter oxygen was slowly introduced at 20 p.s.i. increments over a 30-minute reaction period. Upon completion of the reaction, the autoclave was cooled, depressured and opened and the liquid contents thereof distilled to recover the products. The amount of acetic acid produced was determined by the titration of aliquot portions of the reaction mixture before and after the oxidation to determine the amount of free acetic acid present in the liquid phase. The results of the experiment are summarized in Table 9.

EXAMPLE 20

Example 19 was repeated by charging to the one-half gallon autoclave 500 grams acetic acid containing 1 gram palladium chloride, 6 grams lithium bromide, 6 grams lithium acetate dihydrate, 3 grams cupric acetate and 22 grams acetaldehyde. The autoclave was closed, pressured to 500 p.s.i.g. with ethylene and then heated to 300° F. Oxygen was introduced in 20 p.s.i. increments over a 30-minute reaction period and at the end of the period the autoclave was cooled, depressured, opened and the liquid contents distilled to recover the products. Aliquot portions of the reaction mixture before and after the oxidation were titrated with a standard base solution to determine the concentration of free acetic acid therein. The results are summarized in Table 9.

EXAMPLE 21

Into a one-gallon autoclave was charged 800 grams of a reaction mixture comprising aqueous acetic acid containing 5 percent water and 1.5 grams palladium chloride, 12.7 grams lithium chloride, 6.6 grams lithium acetate, 8 grams cupric acetate monohydrate and 50 grams acetaldehyde. The autoclave was closed, pressured to 500 p.s.i. with ethylene and then heated to 300° F. Nitrogen was added to bring the total pressure to 900 p.s.i.g. and thereafter oxygen was slowly introduced in 20 p.s.i. increments over a 30-minute reaction period. Upon completion of the reaction, the autoclave was cooled, depressured and opened and the liquid contents distilled to recover the products contained therein. Aliquot portions of the reaction mixture before and after the oxidation were titrated with a standard base to determine the concentration of free acetic acid. The results of the experiment are summarized in the following Table 9.

Table 9

| Experiment | Products (Grams) | | | | | | |
|---|---|---|---|---|---|---|---|
| | Acetaldehyde | Vinyl Acetate | Diester | Polyvinyl Acetate | Acetic Acid | | Esters |
| | | | | | Consumed | Produced | |
| 19 | 8.0 | 47.5 | 12 | 5 | 50 | 12 | 5.9 |
| 20 | 1.4 | 37.4 | 9 | 8 | 39 | 29 | 5.9 |
| 21 | 25.7 | 37.0 | 12.6 | 7.9 | 43 | 46 | 3.9 |

EXAMPLE 22

The continuous oxidation of ethylene to vinyl acetate was practiced in a bench scale reactor 36 inches long by 2½ inches internal diameter. The reactor had an internal heat exchange coil and stirrer. The catalyst solution, ethylene, and oxygen were separately introduced into the bottom of the reactor and the mixed gas and liquid effluent were withdrawn through a discharge tube. The liquid holdup in the reactor was 500 milliliters and the solution was supplied to the reactor at 2000 milliliters per hour to provide a 15-minute residence time for the liquid.

The liquid phase reaction medium supplied to the reactor had the following composition:

Component: Grams
- Acetic acid _____ 1000
- Lithium chloride _____ 10
- Lithium acetate monohydrate _____ 10
- Cupric acetate monohydrate _____ 10
- Palladous chloride _____ 1

A series of experiments was performed to investigate the effect of halogen content of the reaction medium and the lithium chloride concentration was altered to one-half and three-halfs that recited in the preceding table.

The reaction was performed at 300° F. and 300 p.s.i.g. pressure. The ethylene was supplied to the reactor at a rate of 2 to 3 times the oxygen rate. The oxygen supply to the reactor was controlled by a gas analyzer which determined the free oxygen content of the effluent gas and controlled the oxygen introduction rate so as to prevent the oxygen from exceeding about 1 volume percent in the effluent gases. The following table summarizes the results:

Table 10

| Run Number | 22A | 22B | 22C | 22D |
|---|---|---|---|---|
| LiCl (weight percent) | 0.5 | 1.0 | 1.5 | 2.0 |
| Ethylene (liters/hr.) | 120 | 140 | 200 | 180 |
| Oxygen (liters/hr.) | 40 | 50 | 80 | 70 |
| Yield Data:[1] | | | | |
| Carbon dioxide | 1.8 | 1.8 | 2.5 | 1.3 |
| Butenes | 3.4 | 8.5 | 8.6 | 7.6 |
| Formaldehyde | 1.4 | 1.2 | 1.0 | 0.8 |
| Ethyl chloride | .0 | 0.4 | 0.7 | 5.8 |
| Acetaldehyde | 15.5 | 28.8 | 35.3 | 35.9 |
| Methyl acetate | 0.5 | 0.4 | 0.5 | 0.5 |
| Vinyl acetate | 60.8 | 41.4 | 34.2 | 30.7 |
| Butyl acetate | 0.6 | 1.0 | 1.0 | 1.0 |
| Acetic acid | 15.0 | 15.4 | 12.9 | 14.2 |
| Propionic acid | 1.0 | 0.8 | 2.1 | 2.3 |

[1] Yields are expressed in mol percent of the ethylene converted.

The preceding data evidence that the distribution of the products can be affected by the variation in the concentration of halide in the reaction zone and in particular that the relative yields of acetaldehyde and vinyl acetate can be varied with variation in the chloride concentration; low chloride contents favoring high yields of vinyl acetate and higher chloride concentrations favoring greater yields of acetaldehyde. Run No. 22D also indicates that with the particular catalyst under study, a concentration of lithium chloride of 2.0 weight percent or greater promotes an undesired degree of halogenation of the olefin to yield ethyl chloride.

EXAMPLE 23

The reactor previously described was modified to permit separate introduction of ethylene and recycle compressors were installed to circulate a large excess of ethylene through the reaction zone. The excess ethylene was used to vaporize the product from the reactor and the liquid level was controlled in the reactor by the supply of fresh acetic acid thereto. The solution in the reactor was periodically sampled during the experiments to determine the chloride and water content and concentrated hydrochloric acid was added as necessary to maintain the chloride concentration at approximately 0.5 weight percent. The vapor effluent from the reaction zone was condensed, the excess ethylene separated therefrom and recycled and the condensed liquid was then distilled to obtain the yield data. The reaction medium composition was as previously described in Example 22; however, one gram ammonium vanadate and 20 grams finely divided silica were also added to each 1000 grams of solvent.

The water content of the reaction medium in the various experiments was varied to determine the effect of water on the distribution of products. The following table summarizes the conditions and yields obtained during these experiments:

Table 11

| Run Number | 23A | 23B | 23C | 23D |
|---|---|---|---|---|
| Temperature,° F | 300 | 300 | 300 | 300 |
| Pressure, p.s.i.g | 759 | 750 | 500 | 300 |
| Oxygen rate (liters/hr.) | 69 | 174 | 122 | 89 |
| Ethylene, liters/hr | 1,740 | 1,455 | 1,625 | 1,530 |
| Water content, wt. percent | 2.4 | 4.4 | 17.3 | 7.0 |
| Yields:[1] | | | | |
| Carbon dioxide | 1.4 | 2.2 | 9.5 | 5.0 |
| Butenes | 15.8 | 7.0 | 6.8 | 6.0 |
| Formaldehyde | 4.7 | 4.0 | 2.3 | 2.7 |
| Ethyl chloride | 0.3 | 0.2 | 0.3 | 0.3 |
| Acetaldehyde | 15.3 | 17.5 | 55.1 | 34.3 |
| Methyl acetate | 0.9 | 0.7 | 1.6 | 4.8 |
| Vinyl acetate | 50.1 | 58.0 | 19.9 | 38.9 |
| Ethyl acetate | 0.9 | 1.4 | 0.7 | 1.3 |
| Ethylidene diacetate | 0.9 | 0.5 | 0.1 | 0.5 |
| Glycol diacetate | 1.0 | 0.2 | 0.3 | 0.4 |
| Propionic acid | 6.0 | 4.9 | 2.0 | 3.6 |
| Vinyl propionate | 0.9 | 1.1 | 0.3 | 0.8 |
| Formic acid | 1.9 | 2.3 | 1.0 | 1.5 |

[1] Yields expressed as mol percent of the ethylene converted.

The preceding data indicate that variation in water content of the reaction medium affects the distribution of the oxidized product; low water contents favoring the production of vinyl acetate and high water contents favoring the production of acetaldehyde. At approximately 7 to 12 weight percent water, the acetaldehyde and vinyl acetate are produced in equal molar quantities.

EXAMPLE 24

The reactor described in Example 22 was employed in experiments to determine the effect of recycled acetaldehyde on the oxidation. The oxidation was performed at 300° F. and 750 p.s.i.g. with the rate of oxygen supply controlled to maintain the oxygen content of the effluent gases less than 1 volume percent. Ethylene was supplied in excess. The reaction medium composition was as follows:

Composition: Grams
- Acetic acid _____ 1000
- Lithium chloride _____ 5
- Lithium acetate dihydrate _____ 10
- Cupric acetate monohydrate _____ 10
- Palladous chloride _____ 1
- Finely divided silica _____ 20

Successive experiments were performed wherein the acetaldehyde recycle rate was 0, 10 and 15 weight percent of the reaction medium. The following table summarizes the conditions of the experiments and the results obtained.

Table 12

| Run Number | 24A | 24B | 24C |
|---|---|---|---|
| Liquid residence time, min | 30.9 | 30.3 | 15.5 |
| Ethylene rate, liters/hr | 204 | 210 | 410 |
| Oxygen rate, liters/hr | 102 | 105 | 205 |
| Reaction medium, ml./hr | 968 | 990 | 1,930 |
| Acetaldehyde recycled, percent of solvent | 0 | 10 | 15 |
| Yields:[1] | | | |
| Carbon dioxide | 5.1 | 6.3 | 5.9 |
| Butenes | 1.2 | 2.1 | 1.3 |
| Formaldehyde | 0.6 | 0.6 | 2.8 |
| Ethyl chloride | | | 0.1 |
| Acetaldehyde | 23.8 | −(1.2) | −(0.9) |
| Methyl acetate | 0.8 | 1.1 | 0.9 |
| Vinyl acetate | 42.4 | 41.4 | 36.7 |
| Butyl acetate | 0.7 | 0.3 | |
| Acetic acid | 17.7 | 43.2 | 40.5 |
| Ethylidene diacetate | 1.0 | 0.7 | 0.1 |
| Glycol diacetate | 0.2 | 0.1 | 0.1 |
| Propionic acid | 5.9 | 4.7 | 9.0 |
| Vinyl propionate | 0.5 | 0.6 | 0.8 |

[1] Yields expressed as mol percent of the ethylene converted.

The preceding data evidence that the acetaldehyde returned to the reaction zone is oxidized in situ to acetic acid and that the production of acetic acid and consumption thereof in the formation of vinyl acetate are approximately equal when the reaction medium contains from 10 to 15 percent acetaldehyde. The data also indicate that the rates of production of acetaldehyde and oxidation to acetic acid are approximately equal with these rates of recycle acetaldehyde; experiments 22B and 22C indicating a slight decrease in acetaldehyde concentration.

The preceding examples are intended solely to illustrate the best mode of practicing my invention and to demonstrate the results obtainable thereby. It is not intended that these examples are to be construed as unduly limiting of the invention but rather the invention is intended to be defined by the steps and reagents and obvious equivalents thereof set forth in the following claims:

I claim:
1. The manufacture of vinyl acetate from ethylene which comprises contacting in a reaction zone ethylene and oxygen at reaction conditions comprising a temperature between about 30° and 300° C. and a pressure between 10 and about 100 atmospheres and sufficient to maintain the liquid phase with an acetic acid reaction medium containing:
   (a) from 5 to about 12 weight percent water;
   (b) from about 0.001 to about 5.0 weight percent of a Group VIII noble metal;
   (c) from about 0.05 to about 5.0 weight percent of a soluble halide selected from the class consisting of chloride and bromides that are soluble in said acetic acid reaction medium; and
   (d) from about 0.1 to about 10.0 weight percent of a soluble acetate salt;

so as to form vinyl acetate from said ethylene and acetic acid, recovering a crude reaction product, separating unreacted ethylene, acetaldehyde and vinyl acetate from said crude reaction product, contacting said acetaldehyde with oxygen at a temperature between 30° and 300° C. to oxidize said acetaldehyde to acetic acid, and adjusting within the aforesaid limitations, at least one of the variables of water content, acetate salt concentration and halide salt concentration of said reaction medium to produce acetaldehyde and vinyl acetate in approximately equal molar quantities and thereby provide sufficient acetaldehyde for oxidation to acetic acid to replace that depleted in the formation of vinyl acetate.

2. The method of claim 1 wherein the halide ion concentration is adjusted between about 0.1 and 2.0 weight percent to produce the desired quantity of acetaldehyde.

3. The method of claim 1 wherein said oxidation of acetaldehyde is performed in the said reaction zone by returning said acetaldehyde to said reaction zone to provide a concentration of acetaldehyde therein between about 5 and 20 weight percent.

4. The manufacture of vinyl acetate from ethylene which comprises contacting ethylene and oxygen at reaction conditions comprising a temperature between about 30° and 300° C. and a pressure between 10 and about 100 atmospheres, sufficient to maintain a liquid phase, with an acetic acid reaction medium containing:
   (a) from 10 to about 20 weight percent water;
   (b) from about 0.001 to about 5.0 weight percent of a Group VIII noble metal;
   (c) from about 0.05 to about 5.0 weight percent of a halide selected from the class consisting of chlorides and bromides that are soluble in said acetic acid reaction medium; and
   (d) from about 0.1 to about 10.0 weight percent of a soluble acetate salt;

so as to form vinyl acetate from said ethylene and said acetic acid, recovering a crude reaction product, separating unreacted ethylene, acetaldehyde and vinyl acetate from said crude reaction product and returning, while continuing said contacting of ethylene and oxygen, said acetaldehyde to said contacting step for further oxidation to acetic acid to replace the acetic acid depleted from said reaction medium in formation of said vinyl acetate.

5. The method of claim 4 wherein said medium contains from about 5 to about 12 weight percent water.

6. The method of claim 4 wherein said crude reaction product comprises water, vinyl acetate, acetaldehyde and unreacted ethylene and is continuously removed from the contacting step, said unreacted ethylene and acetaldehyde are separated from said crude product, and recycled to said contacting step, the remainder of the reaction product is distilled to separate substantially all said water and vinyl acetate from a higher boiling catalyst solution which is recycled to the reaction.

7. The method of claim 4 wherein said Group VIII noble metal is palladium.

8. The method of claim 4 wherein said crude reaction product comprises water in an amount from 5 to about 12 weight percent of the total product, vinyl acetate and acetaldehyde and is continuously removed from said contacting step and distilled to separate said acetaldehyde, substantially all said water and said vinyl acetate from a higher boiling catalyst recycle stream and wherein said acetaldehyde is combined with said higher boiling catalyst recycle stream for oxidation therein to acetic acid to replace the acetic acid depleted from said reaction medium in formation of said vinyl acetate.

9. The oxidation of claim 4 wherein the oxidation is performed in the presence of from 0.1 to about 5 weight percent of a soluble copper salt.

10. The method of claim 1 wherein the concentration of said soluble acetate salt is adjusted between about 0.5 and 5.0 weight percent to produce the desired quantity of acetaldehyde.

References Cited
UNITED STATES PATENTS

| | | | |
|---|---|---|---|
| 1,081,959 | 12/1913 | Grunstein | 260—530 |
| 1,951,789 | 3/1934 | Mueller-Gunradi et al. | 260—530 |
| 3,211,785 | 10/1965 | Kilroy et al. | 260—530 |
| 3,221,045 | 11/1965 | McKeon et al. | 260—493 |

FOREIGN PATENTS 608,610    3/1962    Belgium.

LORRAINE A. WEINBERGER, *Primary Examiner.*

V. GARNER, *Assistant Examiner.*

U.S. Cl. X.R.

260—530, 541, 597, 604, 659

Notice of Adverse Decisions in Interferences

In Interference No. 97,887 involving Patent No. 3,450,748, W. D. Schaeffer, PREPARATION OF VINYL ACETATE ACETALDEHYDE AND ACETIC ACID FROM ETHYLENE, final judgment adverse to the patentee was rendered Aug. 14, 1973, as to claim 1.

[*Official Gazette November 27, 1973.*]